United States Patent [19]

Faunce

[11] 4,270,892

[45] Jun. 2, 1981

[54] APPARATUS FOR MANUFACTURING DENTAL LAMINANT VENEERS

[76] Inventor: Frank R. Faunce, 215 Edinburg Ct., Castlewood, Rte. 4, Jackson, Miss. 39208

[21] Appl. No.: 50,051

[22] Filed: Sep. 21, 1979

[51] Int. Cl.³ .............................................. B29C 17/04
[52] U.S. Cl. .................................. 425/388; 264/554; 264/316; 264/16; 425/384; 425/389
[58] Field of Search ................. 264/554, 316, 314, 16; 425/2, 388, 389, 384

[56] References Cited

U.S. PATENT DOCUMENTS

| | | | |
|---|---|---|---|
| 3,334,383 | 8/1967 | Irvine | 425/389 |
| 3,404,056 | 10/1968 | Baldwin | 425/388 X |
| 3,600,752 | 8/1971 | Kopp | 425/2 |
| 3,682,571 | 8/1972 | Greenberg et al. | 425/388 X |
| 4,034,054 | 7/1977 | Sauer | 264/313 |

*Primary Examiner*—Jan H. Silbaugh
*Attorney, Agent, or Firm*—Gunn, Lee & Jackson

[57] ABSTRACT

Method and apparatus for manufacturing laminant veneers for application to the teeth of a dental patient. The method involves heat and fluid pressure induced forming of a dental laminant veneer to cause the veneer to assume the configuration of a standard mold or a model mold of a dental patient's teeth. The apparatus includes a heat chamber and means to move the dental veneers and mold and the heat chamber into interrelation to cause heat softening of the veneers. A flexible membrane is pressure induced by vacuum or positive pressure and causes the softened veneers to assume the configuration of the mold.

5 Claims, 9 Drawing Figures

APPARATUS FOR MANUFACTURING DENTAL LAMINANT VENEERS

FIELD OF THE INVENTION

This invention relates generally to restorative and cosmetic dentistry as well as orthodontic dentistry, and more particularly concerns a method and apparatus for heat and fluid pressure induced forming of dental laminant veneers. Even more specifically, the invention concerns an improved method for manufacturing laminant veneer elements, either by means of standard molds for general application, or to patient model type molds for prescription application.

BACKGROUND OF THE INVENTION

Following issuance of U.S. Pat. Nos. 3,936,939 and 3,986,261 of Frank R. Faunce, D. D. S., there has developed the manufacture and sale of laminant veneer systems by the Caulk Division of Dentsply International Inc. under the registered trademark MASTIQUE ®. In cases where the teeth of a dental patient are of sound nature but are discolored as the result of intrinsic discoloration that occurs naturally or by introduction of chemical agents into the bloodstream of the patient, such as by excessive flourides in drinking water, various drugs such as tetracycline, etc., this tooth discoloration can have a serious phsychological effect on the patient. It is considered unwise to remove sound tooth structure in order to provide the patient with tooth cap type dental restorations of pleasing cosmetic appearance, especially in view of the very expensive nature of dental caps. Following the teachings of the above-identified U.S. patents, dental laminant veneer systems have been developed that are completely reversible processes, allowing application of thin laminations to the labial surfaces of the teeth of the patient without requiring any destruction of sound tooth structure. These processes enable patients having tooth discolorations but otherwise sound teeth to undergo simple and inexpensive aesthetic restorations that provide the patient with teeth of pleasing appearance. From the psychological standpoint, dramatic results have been witnessed, especially under circumstances where the discolored teeth of young patients are aesthetically improved by application of laminant veneers.

Laminant veneers may be manufactured by laboratory type techniques utilizing a dental model of the patient's teeth in order to prepare molds from which the laminant veneers are manufactured. In each case, the molds are utilized only a single time and therefore, as might well be expected, the manufacturing process is of quite expensive nature even though satisfactory results may be obtained. From a commercial standpoint, laminant veneers have been manufactured utilizing standard mold forms and by manufacturing a large number of standard laminant veneers that may be selectively applied to the teeth of a dental patient. These laminant veneers, although being of much less expensive nature as compared to the veneers produced by laboratory type manufacture, in many cases require some degree of hand working in order to achieve a proper fitting relation with the patient's teeth. Although mass produced laminant veneers are widely accepted in the market, there is nevertheless a need for laminant veneers that more accurately fit the teeth of the patient involved and have the degree of thinness that is desired by many dentists that are presently involved in aesthetic restorations with laminant veneers. It is also considered desirable from the standpoint of installation to form each laminant veneer to a model of the patient's teeth, as in laboratory type manufacture in order that the resulting veneers will have a precise fit with each of the teeth of the patient. Heretofore, achieving a precise fit of laminant veneers to the teeth of the patient could only be achieved by means of an expensive laboratory process. It is also desirable to provide a method of forming laminant veneers by means of manufacturing procedures of less expensive nature than present molding processes and to enable individual dental practitioners to form laminant veneer elements by means of simple office laboratory procedures and establish a precise fit of such laminant veneers with the individual teeth of a patient. Heretofore, such has not been considered practical.

Accordingly, it is a primary feature of the present invention to provide a novel method of forming laminant veneers for dental application wherein veneer manufacture may be accomplished commercially in large volume and at low cost or may be accomplished by individual dental practitioners utilizing simple and reliable procedures in the environment of dental office laboratories.

It is also a feature of the present invention to provide a method of manufacturing laminant veneers wherein the cost of manufacture will be significantly lessened as compared to present manufacturing costs, thereby enabling efficient manufacture of a wide variety of veneer sizes and shapes, and thus enabling dental practitioners to accomplish excellent laminant fitting with the teeth of most dental patients.

It is an even further feature of the present invention to provide a novel method of manufacturing laminant veneers wherein a dental practitioner is enabled to selectively utilize mass produced laminant veneers or prescription manufactured laminant veneers in treatment of dental patients without necessitating extensive time and excessive expense to accomplish aesthetically pleasing results for the dental patients involved.

Among the several features of the present invention is noted the contemplation of novel apparatus for accomplishing manufacture of laminant veneers, wherein such apparatus is easily adapted for large volume commercial manufacture of laminant veneers or for prescription manufacture for the individual teeth of a dental patient.

It is an even further feature of this invention to provide novel apparatus for the manufacture of dental laminant veneers wherein veneer blanks of flat or partial tooth configuration may be efficiently formed by means of heat and pressure inducement, thereby promoting the use of a limited number of tooth forms in order to achieve development of a large variety of inexpensively manufactured dental veneers.

It is an even further feature of this invention to provide novel apparatus for manufacturing dental veneers that is reliable in use and does not sacrifice in any manner whatever from the standpoint of optimum quality.

Other and further objects, advantages and features of this invention will become obvious to one skilled in the art upon an understanding of the illustrative embodiments about to be described and various advantages, not referred to herein, will occur to one skilled in the art upon employment of the invention in practice.

SUMMARY OF THE INVENTION

The present invention is directed to the provision of a novel method for the manufacture of dental laminant veneers and and other objects and to novel apparatus that may be employed in the process of manufacture. The method of manufacture generally concerns the provision of a mold form having at least a portion thereof defining a veneer receiving surface of a desired tooth configuration. This mold surface may be provided by a commercial mold form or by the tooth configuration defined by a model of a patient's teeth. A veneer blank is then provided which is composed of a heat deformable plastic material, which veneer blank may be of originally flat configuration or may be semi-formed to the configuration of a tooth to which the veneer element is to be ultimately bonded. There is then provided a yieldable molding surface that is adapted to conform to the configuration of the veneer receiving surface of the mold and is adapted to apply a force against the veneer element, tending to form the veneer element to the configuration of the veneer receiving surface of the mold. In one form of the invention, the yieldable molding surface is defined by a flexible membrane that is urged against the veneer and mold by means of vacuum or positive pressure and is sufficiently flexible so as to conform the veneer element intimately to the precise surface configuration of a dental tooth model or mold. Vacuum or pressure induced molding is accomplished in the presence of heat developed within a heat chamber into which the veneer and mold are positioned for a sufficient length of time to enable the veneer element to soften and be permanently conformed to the configuration of the mold. After this has been accomplished, the veneer element and mold are removed from the heat chamber and the veneer element is allowed to cool sufficiently that it becomes hardened. Upon removing the hardened and formed veneer element from the mold, the veneer element is immediately ready for application to the teeth of a patient, as in the case of dental office veneer forming or distribution to the dental industry as in the case of commercial manufacture.

In one exemplar embodiment, apparatus for heat and pressure forming of laminant veneer elements is accomplished by means of a mechanism incorporating a carrier plate that is perforated, with the perforations being in communication with a vacuum chamber that is controllably evacuated by means of a suitable source of vacuum such as a vacuum pump. A flexible membrane composed of a heat resistant flexible material, such as silicone rubber, is positioned above the carrier plate and is vertically movable with the carrier plate on a common axis therewith. A mold, which may be a dental model mold of a patient's teeth or a commercial mold form of standard nature, is positioned on the carrier plate and, upon upward movement of the carrier plate, is brought into contact with the flexible membrane. As the carrier plate moves further upwardly, the mold with the veneer elements attached thereto deforms the flexible membrane and causes the outer edge portions of the carrier plate to establish a seal with the membrane. Upon reaching the upper limits of its travel, the mold with the veneer elements attached is positioned within a heat chamber that is maintained within a predetermined heat range that is appropriate for accomplishment of the molding process. After a seal has been established between the flexible membrane and the carrier plate, the source of vacuum is selectively activated, thereby causing the membrane to be forced tightly against the mold and carrier plate by atmospheric pressure and thereby applying significant force to the veneer elements, urging the veneer elements to conform to the intricacies of the mold surface. Upon becoming softened by heat, the force applied by the flexible membrane causes the veneer elements to conform precisely to the mold. After this has been accomplished, the carrier plate is withdrawn from the heat chamber with the vacuum condition being continued so that the flexible membrane maintains the veneer elements in intimate conforming relation with the mold during cooling and hardening of the veneer elements. After the veneer elements have been properly cooled, the vacuum condition is discontinued, the mold is removed from the carrier plate and the veneer elements removed from the mold.

BRIEF DESCRIPTION OF THE DRAWINGS

So that the manner in which the above-recited features, advantages and objects of the present invention are attained and can be understood in detail, more particular description of the invention briefly summarized above may be had by reference to the embodiments thereof which are illustrated in the appended drawings, which drawings form a part of this specification.

It is to be noted, however, that the appended drawings illustrate only exemplary embodiments of this invention for accomplishment of the manufacturing process set forth herein and are therefore not to be considered limiting of the scope of the invention, for the invention may readily admit to other equally effective embodiments without departing from the spirit and scope of this invention.

In the drawings

FIG. 1 is an isometric pictorial representation of a dental veneer forming mechanism constructed in accordance with the present invention.

FIG. 2 is a sectional view of the apparatus of FIG. 1 taken in elevation and illustrating the internal mechanism thereof in detail.

FIG. 3 is a fragmentary sectional view of the veneer forming apparatus of FIGS. 1 and 2, taken along line 3—3 of FIG. 2 and illustrating the carrier mechanism in detail.

FIG. 4 is a partial sectional view of the mold carrier membrane support and heat chamber structure of the mechanism of FIGS. 1 and 2, illustrating positioning of the mold into the heat chamber prior to evacuation.

FIG. 5 is a sectional view similar to the view of FIG. 4 and illustrating the evacuated condition of the mold support mold and membrane structures during heat softening of the veneer elements and pressure induced forming thereof to the configuration of the mold.

FIG. 6 is a view taken along line 6—6 of FIG. 2 and illustrating the hand wheel latch mechanism in detail.

FIG. 7 is a fragmentary sectional view of the membrane and membrane support frame structure.

FIG. 8 is a schematic mechanical illustration of apparatus representing a modified embodiment of this invention and depicting energization of the apparatus by positive pressure generated by pneumatic or hydraulic means.

FIG. 9 is a further schematic mechanical illustration representing a further modified embodiment of this invention and depicting generation of positive molding pressure by mechanical means such as a soft resilient mass defining a yieldable mold engaging surface.

DESCRIPTION OF PREFERRED EMBODIMENT

Figure 1:
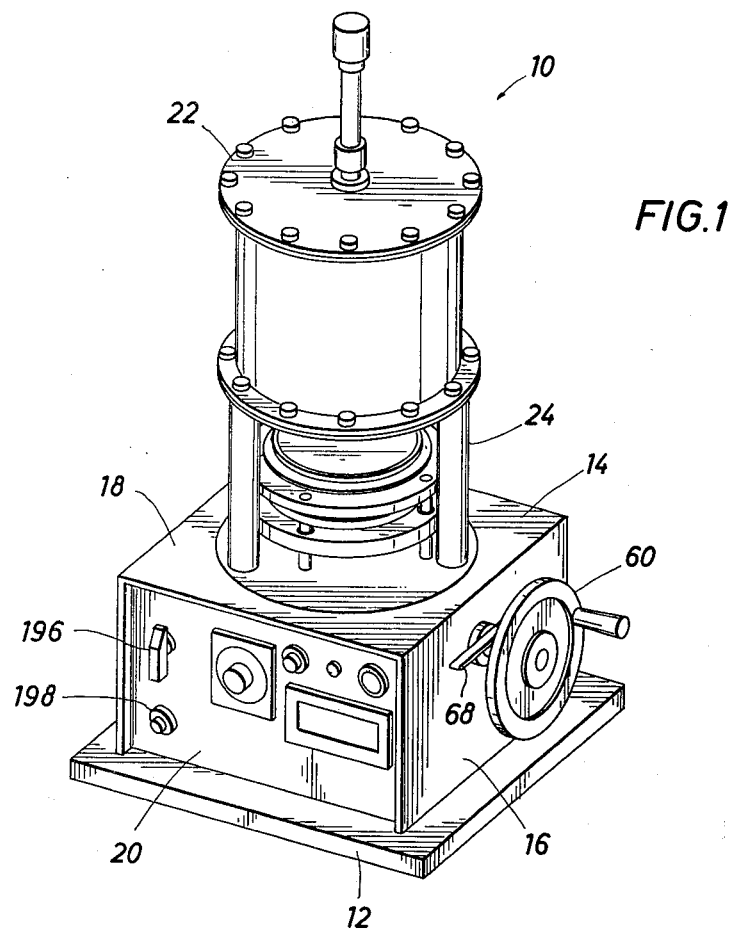

Referring now to the drawings, and first to FIG. 1, there is illustrated a mechanism generally at 10 for accomplishing heat and pressure induced forming of dental veneers according to the teachings of this invention. In its general form, the mechanism of FIG. 1 incorporates a base plate 12 on which is mounted a base housing structure 14 having side walls 16 and a top wall 18 that cooperate with a front wall structure 20 to define an enclosure within which is housed various electrical components for controlling heat within a predetermined temperature range and mechanical components for controlling application of vacuum and for elevating a dental model or mold into a heat chamber. The front wall structure 20 is preferably connected to the base 12 and is interfitted with the side walls 16 and top wall 18 in such manner that the front wall 20 is stabilized with respect to the base structure and housing. For the purpose of gaining access to the housing to service the electrical and mechanical components, the housing 14 is readily removable and may be efficiently removed without disturbing any of the mechanical or electrical components of the apparatus. A heat chamber or oven structure 22 is supported by a plurality of standoff elements 24 and is formed to define a bottom opening structure through which a dental model or mold may be inserted for purposes of heat and vacuum forming of laminant veneers.

Figure 2:
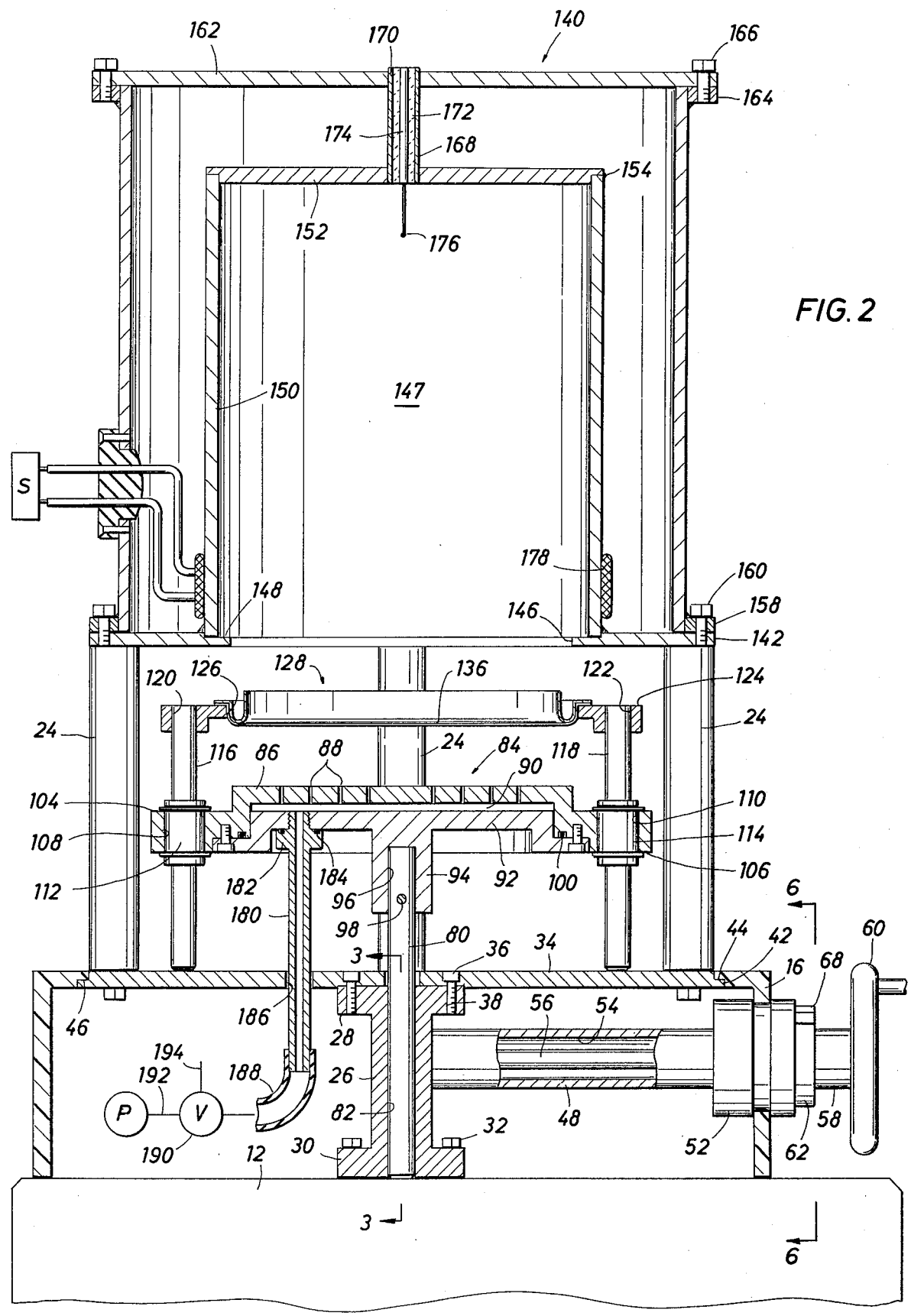

Referring now particularly to FIG. 2, a support pedestal structure is illustrated at 26 and is formed to define an upper flange structure 28 and a lower flange 30 with flange 30 being secured to the base structure 12 by means of bolts 32. A support plate structure 34 which is shown to be of generally circular configuration but may be of any other suitable form, is supported by the upper flange structure 28 of the pedestal structure 26 by means of a plurality of cap screws 36 that extend through appropriate apertures formed in the plate structure 34 and are received within threaded apertures 38 defined in the upper flange structure 28 of the pedestal. In order to establish a proper interfitting relationship between the support plate 34 and the flange 28, a recess 40 is formed in the underside of the plate 34 and the upper portion of the flange structure 28 is received in fitting relation therein. The outer peripheral portion of the support plate structure 34 is formed to define a peripheral support flange 42 defining a support shoulder 44 against which is received a shoulder surface 46 of the upper housing wall 18. Thus, the upper housing wall 18 is supported by the support plate structure 34 with the lower surfaces of the side walls 16 merely in engagement with the upper surface of the base structure 12.

Figure 3:
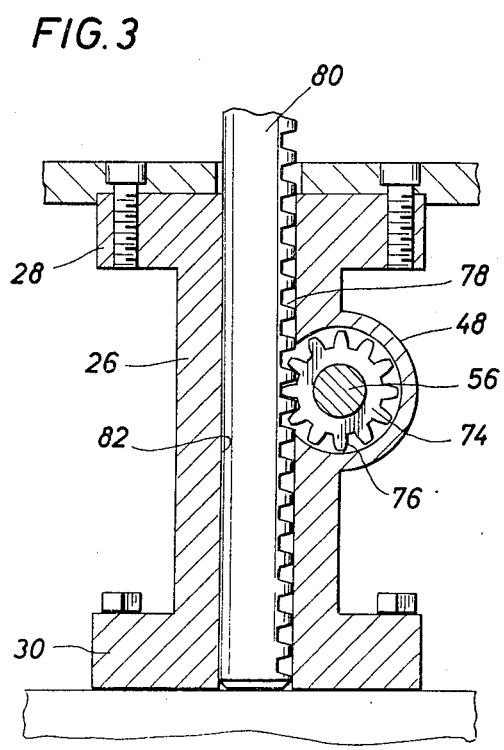
Figure 6:
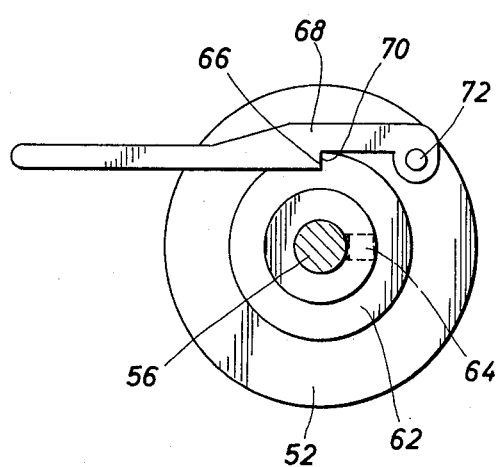

As is evident from FIG. 2 and shown in section in FIG. 3, the pedestal element 26 is provided with a transverse shaft support portion 48 that cooperates with the pedestal structure to define a gear housing 50 and also defines an enlarged terminal portion 52 that extends through the side wall structure 16 and defines an internal bore 54 through which extends a gear drive shaft 56. The gear drive shaft terminates at an end portion 58 having a hand wheel 60 connected in nonrotatable relation therewith. As shown in FIGS. 2 and 6, a lock structure is provided in order to lock the shaft 56 against rotation after having reached a preselected position. A lock adjustment element 62 is locked with respect to the shaft 56 by means of a set screw 64, or any other suitable locking element, and positions a latching shoulder 66 in proper position relative to the shaft. A latch element 68 defining a latching shoulder 70 is pivotally connected to the terminal structure 52 by means of a pivot element 72. Upon proper positioning of surface 66, the latch element 68 falls into position by gravity, or is moved into position manually, thus positioning the latching shoulder 70 thereof for engagement with surface 66 and precluding counterrotation of the shaft 56 until the latch element 68 is moved upwardly, clearing the shoulder 66.

As shown in FIG. 3, at the inner extremity of the shaft 56 is provided a pinion gear 74 defining gear teeth 76 that are adapted for meshing engagement with gear teeth 78 of a rack element 80 that is positioned for vertical movement within a vertical bore 82 defined in the pedestal.

Figure 7:
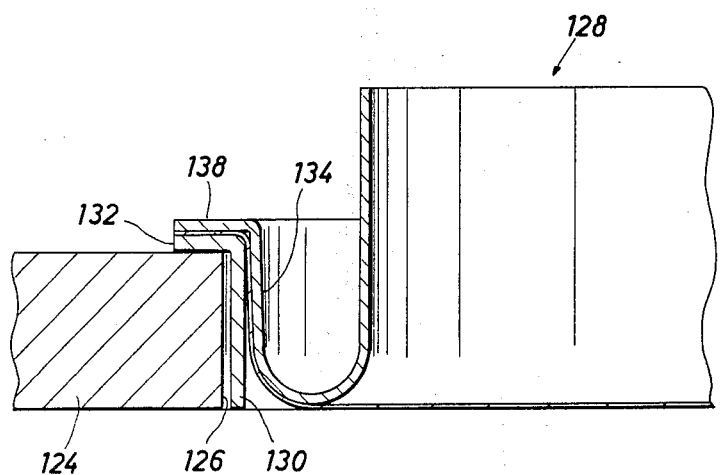

A carrier structure illustrated generally at 84 in FIG. 2 is defined by an upper perforate plate structure 86 having a plurality of perforations 88 formed therein which communicate with a vacuum chamber 90 defined by the cooperative relation of the upper perforate plate 86 with a lower imperforate plate structure 92. The imperforate plate 92 is formed to define a central dependent boss portion 94 having a recess 96 formed therein that is adapted to receive the upper extremity of the rack element 80. Connection between the rack element and the dependent boss portion 94 is established by means of a transverse connecting pin 98 which extends through registering apertures formed in the rack element and the boss structure 94. As the rack element 80 is raised and lowered by means of the pinion gear, rotated by shaft 56, the carrier structure 84 is moved vertically responsive to selective rotation of the hand wheel 60. The connection between the plate structures 86 and 92 is sealed by means of an annular ring seal such as an O-ring or the like 100 which is received within an appropriate groove formed in the plate structure 86. Cap screws 102 function to retain the plates 86 and 92 in structural assembly. Opposed side portions 104 and 106 of the upper perforate plate structure 86 are formed to define bearing receptacles 108 and 110, respectively, that receive bearing elements 112 and 114 that provide guiding relationship between the carrier structure 84 and a pair of guide posts 116 and 118. The upper extremities of the respective guide posts are received in immovable relation within apertures 120 and 122 formed in a membrane support carrier 124. The membrane support carrier is formed internally to define a generally circular opening 126 within which is received a membrane and membrane support frame structure shown generally at 128 and which is loosely received within the opening 126 and is adapted for simple and easy replacement, as necessary, to maintain proper operation of the veneer forming mechanism. The membrane and membrane support structure is illustrated in detail in FIG. 7 and incorporates an outer support ring structure 130 that is received within the opening 126 and which defines an upper flange structure 132 that rests upon the upper surface of the membrane support carrier 124. An inner frame element 134 interfits with the outer frame element 130 in such manner as to tightly retain a membrane element 136 in interlocked engagement therebetween. An annular flange portion 138 of the inner retainer structure 134 cooperates with flange 132 of outer membrane support ring 130 to retain the outer peripheral portion of the membrane 136 in interlocked engagement therebetween. The membrane and membrane support frame structure 128 establishes a loose fit within the circular opening 126 and may be simply and efficiently removed when replacement of the membrane is desired.

The standoff elements 24 are composed of any suitable heat resistant structural material and provide support for a heated chamber or oven illustrated generally at 140. The oven 140 includes an oven base plate 142 that is formed to define a central opening 146 and an annular recess 148 about the opening within which is received the lower extremity of an inner oven wall 150. The upper extremity of the inner wall of the oven is closed by means of an upper closure plate 152 that may be tack welded to the inner wall 150 as shown at 154 or positively interconnected therewith in any other suitable manner. An outer oven housing is defined by an outer wall structure 156 having a support flange 158 at the lower portion thereof defining a plurality of apertures through which bolt elements 160 extend. The bolts also extend through the standoff elements 24 and the support plate structure 34 in order to secure the oven structure with respect to the support plate. The upper portion of the outer housing structure is defined by a removable closure plate 162 which is secured to a flange structure 164 of the outer housing wall 156 by means of bolts or screws 166. A tube element 168 is interconnected with the upper wall structure 152 of the inner oven housing and extends through an aperture 170 defined in the upper closure plate 162. An insulated plug element 172 is received within the tube 170 and defines a small bore 174 through which extends a thermocouple element 176 that is coupled with temperature sensing means in order to enable the temperature of the heat chamber or oven to be detected and further enabling the oven heat to be accurately controlled within a predetermined temperature range.

For application of heat to the heat chamber or oven, an electrical heater element 178 is secured about the inner wall structure 150 of the oven and is connected with a controlled source S of electrical energy that allows the oven temperature to be controllably maintained within a predetermined temperature range. The space between the inner and outer walls 150 and 156 of the oven structure, as well as the space between upper walls 152 and 162, is filled with a heat insulation material capable of withstanding the temperature range that is expected for accomplishing various heat and vacuum forming operations while at the same time maintaining the outer oven wall structure 156 of sufficiently cool temperature to obviate any danger to operating personnel in charge of the apparatus.

Although the structure and operation of the heat and vacuum forming apparatus of this invention is described herein particularly as it relates to the manufacture of dental veneers, it should be borne in mind that utilization of the apparatus is not intended to be restricted solely to the manufacture of dental veneers. The apparatus and the membrane force induced activity makes the apparatus effective for manufacture of dental mouthguards, dental veneer mounted orthodontic bracket systems and indirect bonding carrier systems for achieving accurate positioning of dental veneers and veneer supported orthodontic brackets on the teeth of a patient by means of a prescription, indirect bonding technique. In some cases, a sheet of heat softened plastic may be supported in a special carrier device that is substituted for the membrane and membrane support frame structure 128. A suitable mold may be provided on the carrier structure 84 and the mold will then be moved upwardly into engagement with the plastic sheet. After the sheet has become softened and becomes draped about the mold and suitably covers the apertures 88 of the perforate plate 86, the source of vacuum is energized, thus causing the chamber 90 to be evacuated and causing atmospheric pressure induced forcing of the plastic material into the intricacies of the mold. For the manufacture of mouthguards and mouthguard type devices, a plastic mouthguard blank is positioned on a mold that is supported on a carrier structure 84 and the mouthguard blank is moved upwardly into engagement with the membrane element 136. As the mouthguard blank softens, it drapes slightly about the mold and the carrier is then energized, causing the mouthguard and mold to be introduced into the heat chamber by deforming the membrane. Vacuum is applied in the manner discussed above to cause the mouthguard blank to be accurately formed about the mold by the membrane. The mechanism of this invention may be effectively utilized for many other heat and vacuum induced molding operations.

For the purpose of communicating the vacuum chamber 90 with a source of vacuum, a tube element 180 having a head portion 182 is threaded into the imperforate plate structure 92 in such manner as to bring a sealing element 184 thereof into sealing engagement with the plate 92. The tube 180 is of considerable length and extends through an aperture 186 defined in the support plate 34. A vacuum hose 188 is connected with the tube 180 and is also connected to a three-way vacuum control valve 190 that is communicated with a pump P by means of a conduit 192 and with the atmosphere by means of a conduit 194. The vacuum valve 190 is operated manually by means of an external valve handle 196 that is mounted on the front wall 20 of the housing structure. A vacuum connection 198, also mounted on the front wall, forms a connecting element for the conduit 192 thereby enabling the apparatus to be provided with a source of vacuum simply by connecting a pump vacuum hose to the connecting element 198.

Figure 4:
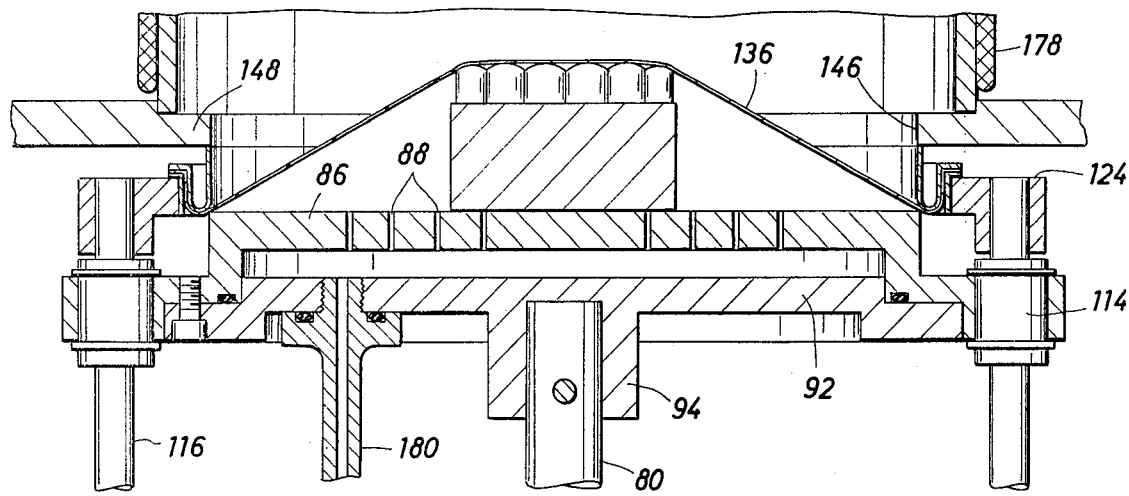
Figure 5:
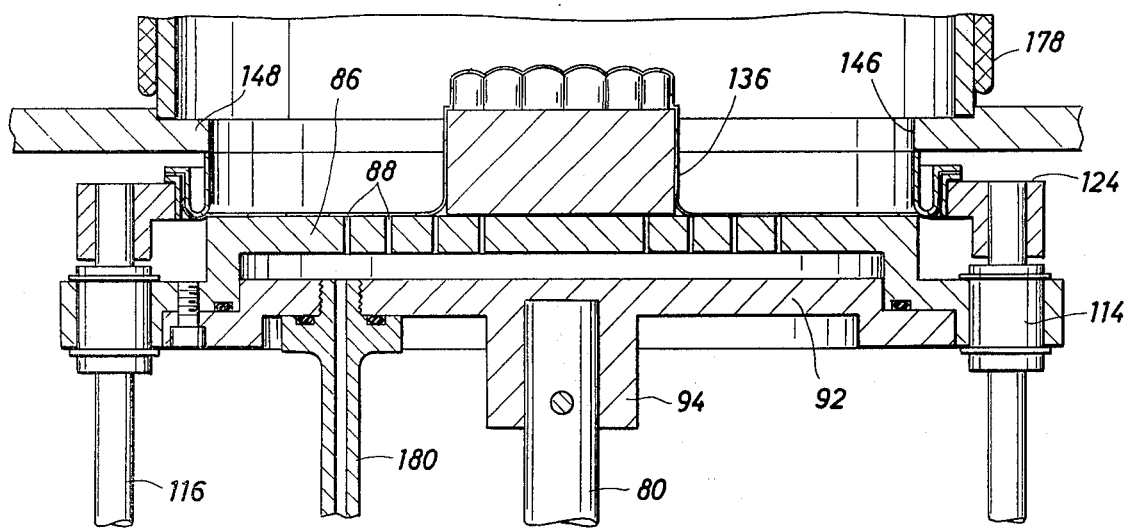

In operation, a model or mold is placed on the carrier structure 84 and the carrier is raised to the FIG. 4 position thereof, forcing the membrane 136 and the model or mold upwardly and positioning the same within the heat chamber 147. After this has been done, activation of the vacuum system in the manner mentioned above causes the membrane to assume the condition illustrated in FIG. 5, thus tightly urging the membrane into forming engagement with a veneer element, or any other suitable device that is being heat formed, and a mold by way of the apparatus 10. After appropriate heat forming has been accomplished, the carrier element 84 is again moved to the FIG. 2 position thereof with the evacuation system remaining active until such time as appropriate cooling has occurred and the heat softened element has cooled sufficiently to maintain the newly molded form. The vacuum source is then deenergized by rotating the valve 190 to the vent position thereof, communicating chamber 90 with the atmosphere via conduits 194, 198 and tube 180. After this has been done, the heat and vacuum formed product is then removed along with the mold.

Figure 8:
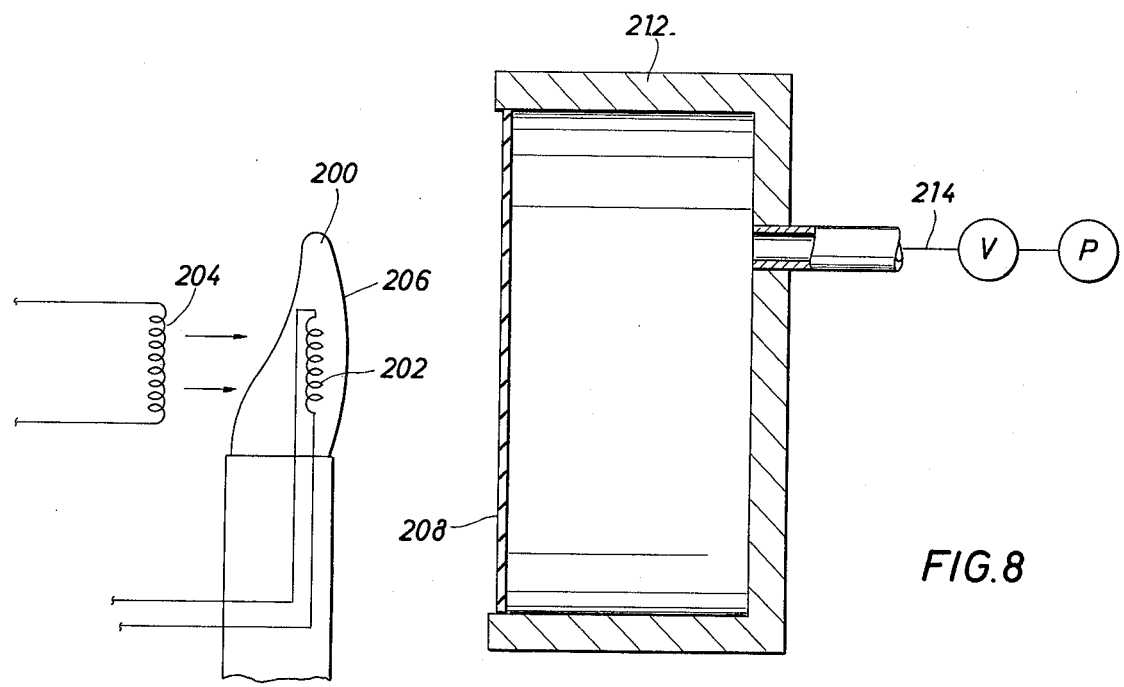
Figure 9:
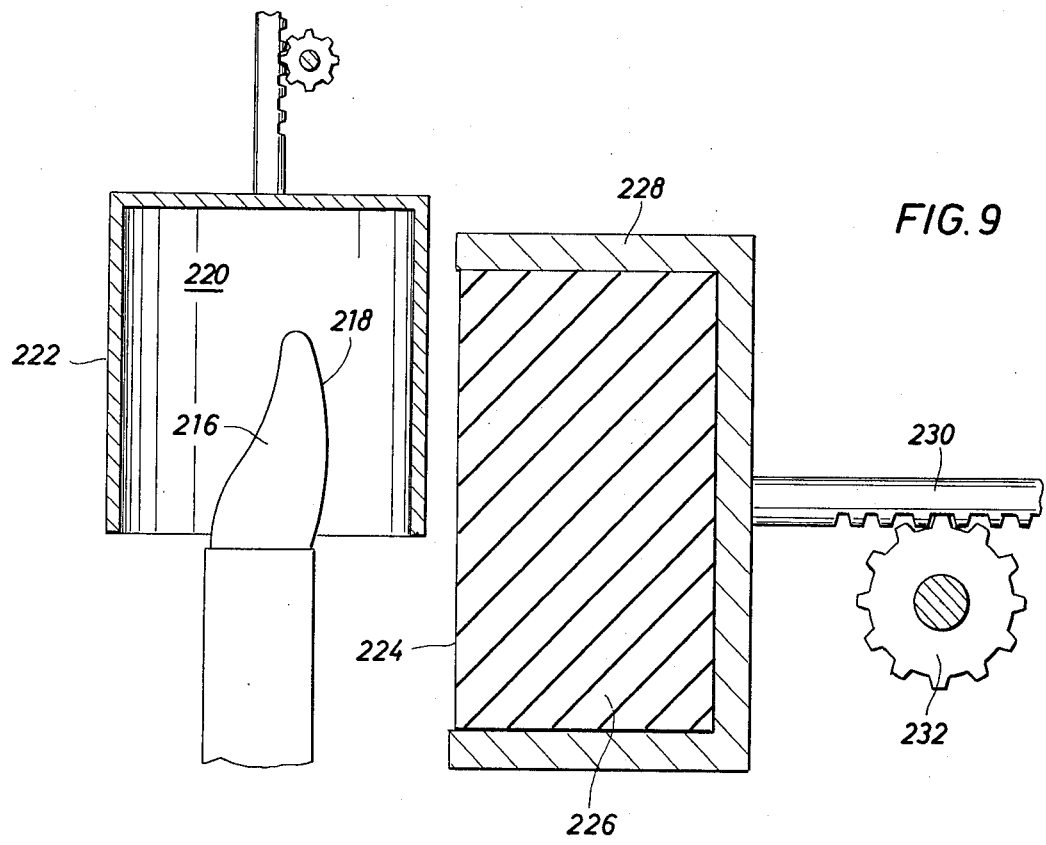

The invention may take other suitable forms as illustrated in FIGS. 8 and 9. In FIG. 8 a mold is provided as shown at 200 that may be heated internally by means of an electrical resistance type heating element 202 or externally by means of a radiant type electrical heating element 204 with heat radiating as shown by arrows.

The mold 200 defines a molding surface 206 against which is positioned a laminant veneer element or other element to be heat and pressure formed. Pressure forming is induced by a flexible membrane that defines a movable and yieldable wall of a pressure chamber 210 having a generally rigid wall structure 212. The chamber 210 is communicated with a source of fluid pressure P by means of a conduit 214 having a control valve V, thereby enabling the chamber 210 to be selectively pressurized. The positive pressure medium of the chamber 210 may be of pneumatic or hydraulic nature as desired and causes the flexible membrane 208 to be forced into molding engagement with the mold 200 thus forming a dental laminant or other object to the configuration of the mold. The mold is replaceable with other molds to lend the apparatus the capability of forming a variety of molded objects.

In FIG. 9 a further embodiment of the invention is illustrated schematically wherein dental laminant veneers and other heat and pressure formable objects are capable of being mechanically formed. A mold 216 which may be internally or externally heated in the manner illustrated in FIG. 8, defines a mold surface 218 of suitable form. A further method of heating may be accomplished by means of a heat chamber 220 defined by an oven 222 that may be moved to enveloping relation about the mold 216. After heat softening of a dental laminant veneer or other object by the heated chamber, the oven 222 may be retracted and a yieldable forming surface 224 is brought into molding contact with the mold surface 218. The surface 224 is defined by a resilient mass 226 formed of yieldable material such as soft rubber that will conform to the surface intracacies defined by the mold surface 218. The mass of resilient material is housed in a carrier 228 that is linearly movable such as by a rack and pinion arrangement 230—232 or by any other suitable source of mechanical movement.

In view of the foregoing, it is apparent that I have provided a unique and novel apparatus for heat and vacuum forming dental veneers, as well as other devices employed in the field of dentistry and elsewhere. Although the apparatus has been discussed herein particularly as it relates to vacuum forming, it is not intended to restrict the invention solely to utilization of vacuum as the motive source for movement of a membrane or molding surface into molding engagement with a mold and an article to be formed against the mold. For example, the motive force might take the form of a positive pressure, either developed pneumatically within a pressure chamber having a flexible wall defining the molding surface. Alternatively, the motive force might be induced positively by means of hydraulic pressure such as might be developed by any suitable hydraulic fluid medium, such as water or oil. Alternatively, the motive force might be developed by a soft resilient material that is moved mechanically into engagement with a mold and positioned within a heated chamber for a sufficient length of time to accomplish heat and pressure induced forming of a product of the nature of a laminant veneer or the like.

It is therefore apparent that the present invention is one well adapted to attain all of the objects and advantages hereinabove set forth, together with other advantages which will become obvious and inherent from an understanding of the apparatus and method presented in accordance with the teachings of this invention. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. Apparatus for use in conjunction with a mold for heat and vacuum induced forming of objects such as dental laminant veneers adapted to be bonded to the teeth of dental patients, said apparatus comprising:
    a base support structure;
    a heating chamber having a closed top wall, closed side walls and a bottom wall defining a heating opening;
    electrically energized heating means for heating said heating chamber;
    support means establishing substantially fixed interconnection of said heating chamber to said base support structure;
    a mold support structure being movably interconnected with said base support structure, said mold support structure defining a vacuum chamber and defining a plurality of apertures communicating with said vacuum chamber;
    a source of vacuum being selectively communicated with said vacuum chamber;
    means for imparting movement to said mold support structure to transport said mold support structure to a position of juxtaposed relation with said heating opening such that a mold positioned on said mold support structure will be positioned within said heating chamber;
    a diaphragm adapted to be yieldably moved by said source of vacuum into cooperation with a mold positioned on said mold support structure;
    diaphragm support means being movably interconnected with said mold support structure and supporting said diaphragm in interposed relation between said mold support structure and said bottom wall of said heating chamber, said diaphragm support element being transported along with said mold support structure; and
    a resilient diaphragm element being secured in assembly with said diaphragm support means.

2. Apparatus as recited in claim 1, wherein said diaphragm support means comprises:
    a support frame adapted to receive the outer peripheral portion of said diaphragm in sealed relation therein; and
    guide means being interconnected with said support frame, said guide means being connected in guided relation with said mold support structure.

3. Apparatus as recited in claim 1, wherein said support means comprises:
    a support base;
    a support pedestal extending upwardly from said support base; and
    a support plate being provided at the upper portion of said support pedestal, said support means being interconnected with said support plate.

4. Apparatus as recited in claim 1, wherein:

an actuator shaft is movably supported by said pedestal and is connected in supporting relation with said mold support structure; and actuator means is movably interconnected with said pedestal and is connected in driving relation with said actuator shaft, upon movement of said actuator means said actuator shaft and mold support structure are moved linearly relative to said heating chamber.

5. Apparatus as recited in claim 4, wherein:

lock means is provided to lock said actuator means in a selected position to maintain said mold support structure and diaphragm support means in juxtaposed relation with said heating opening.

* * * * *